(12) United States Patent
Oike (10) Patent No.: US 11,015,718 B2
(45) Date of Patent: May 25, 2021

(54) VALVE DEVICE (71) Applicant: TLV CO., LTD., Hyogo (JP)

(72) Inventor: Tadashi Oike, Kakogawa (JP)

(73) Assignee: TLV CO., LTD., Hyogo (JP)

( * ) Notice: Subject to any disclaimer, the term of this patent is extended or adjusted under 35 U.S.C. 154(b) by 134 days.

(21) Appl. No.: 16/453,086

(22) Filed: Jun. 26, 2019

(65) Prior Publication Data

US 2019/0316686 A1 Oct. 17, 2019

Related U.S. Application Data

(63) Continuation of application No. PCT/JP2017/037783, filed on Oct. 19, 2017.

(30) Foreign Application Priority Data

Jan. 16, 2017 (JP) .............................. JP2017-004866

(51) Int. Cl.
*F16K 1/42* (2006.01)
*F16K 31/22* (2006.01)
(Continued)

(52) U.S. Cl.
CPC ................ *F16K 1/42* (2013.01); *F16K 31/22* (2013.01); *F16T 1/22* (2013.01); *F16K 25/00* (2013.01);
(Continued)

(58) Field of Classification Search
CPC .......... F16K 1/42; F16K 31/22; F16K 31/002; F16K 31/18; F16K 25/00; F16T 1/22; F16T 1/38; F16T 1/10
See application file for complete search history.

(56) References Cited

U.S. PATENT DOCUMENTS 3,010,475 A * 11/1961 Kittler ...................... F02M 1/00
137/426
3,631,882 A * 1/1972 White, Jr. ............... F16K 7/126
137/312

(Continued)

FOREIGN PATENT DOCUMENTS

DE 102012025058 A1 6/2014
JP S61-66270 U 5/1986
(Continued)

OTHER PUBLICATIONS

Extended European Search Report issued by the European Patent Office dated Dec. 17, 2019, which corresponds to EP17891864.5-1015 and is related to U.S. Appl. No. 16/453,086.

(Continued)

*Primary Examiner* — Jessica Cahill
*Assistant Examiner* — Patrick C Williams
(74) *Attorney, Agent, or Firm* — Studebaker & Brackett PC (57) ABSTRACT

A drain trap includes: a casing having a fluid channel; and a second valve mechanism including a second valve seat having a seat surface in a ring shape and a second valve body configured to be displaced to be separated from and seated on the seat surface of the second valve seat so that and the second valve mechanism opens and closes the channel. The second valve seat is held to be movable back and forth along a center axis of the ring shape such that the seat surface of the second valve seat and the seat surface of the second valve body are separated from each other and contact each other, and is held to be rotatable about the center axis of the ring shape.

6 Claims, 6 Drawing Sheets

(51) Int. Cl.
  *F16T 1/22* (2006.01)
  *F16T 1/10* (2006.01)
  *F16K 25/00* (2006.01)
  *F16K 31/18* (2006.01)
  *F16T 1/38* (2006.01)
  *F16K 31/00* (2006.01)
(52) U.S. Cl.
  CPC ............ *F16K 31/002* (2013.01); *F16K 31/18* (2013.01); *F16T 1/10* (2013.01); *F16T 1/38* (2013.01)

(56) References Cited

U.S. PATENT DOCUMENTS 3,785,555 A * 1/1974 Fujiwara ............... F16T 1/38
                                                    236/53
3,985,836 A * 10/1976 Fischer ................ F02M 5/12
                                                   261/39.2
4,224,962 A *  9/1980 Orszullok ............ F16K 11/044
                                                   137/465

FOREIGN PATENT DOCUMENTS

| | | |
|---|---|---|
| JP | H02-125197 A | 5/1990 |
| JP | 2002-089785 A | 3/2002 |
| JP | 2008-045615 A | 2/2008 |
| JP | 2009-257435 A | 11/2009 |
| WO | 2016/199628 A1 | 12/2016 |

OTHER PUBLICATIONS

International Search Report issued in PCT/JP2017/037783; dated Nov. 28, 2017.

* cited by examiner

VALVE DEVICE

CROSS-REFERENCE TO RELATED APPLICATION

This is a continuation of PCT International Application PCT/JP2017/037783 filed on Oct. 19, 2017, which claims priority to Japanese Patent Application No. 2017-004866 filed on Jan. 16, 2017. The disclosure of this application including the specification, the drawings, and the claims are hereby incorporated by reference in its entirety.

FIELD

The present application relates to a valve device.

BACKGROUND

A drain trap that reduces discharge of steam and discharges drain has been known to date as a valve device. A drain trap disclosed in Japanese Patent Application Publication No. 2002-89785, for example, includes a valve seat having a valve hole and a valve body for opening and closing the valve hole, in a channel where drain is distributed. When drain flows in this drain trap, the valve body opens the valve hole so that drain is distributed. On the other hand, when steam flows in the drain trap, the valve body closes the valve hole so that distribution of steam is inhibited.

SUMMARY

In a valve device as described above, foreign matter such as scales and dust might be deposited on the valve body or the valve seat after a long-term use. Once foreign matter has been deposited, it is difficult for the valve body to hermetically close the valve hole, and leakage of steam occurs.

A technique disclosed in the present application has been made in view of the foregoing circumstances, and has an object of preventing or reducing leakage of fluid caused by foreign matter attached to a valve body or a valve seat.

To achieve the object, a valve device according to the present application includes a valve mechanism that displaces a valve seat toward a valve body to bring a seat surface of the valve seat into contact with a seat surface of the valve body so that the valve seat can further rotate.

Specifically, the valve device according to the present application includes a casing and a valve mechanism. The casing includes a channel for fluid. The valve mechanism includes a valve seat having a seat surface in a ring shape and a valve body configured to be displaced to be separated from and seated on the seat surface of the valve seat so that the valve mechanism opens and closes the channel. The valve seat is held to be movable back and forth along a center axis of the ring shape such that the seat surface of the valve seat and the seat surface of the valve body are separated from each other and brought into contact with each other, and the valve seat is held to be rotatable about the center axis of the ring shape.

As described above, in the valve device according to the present application, the valve seat is moved back and forth in predetermined directions so that the seat surface of the valve seat and the seat surface of the valve body can be separated from each other and brought into contact with each other. The valve seat is rotated about a predetermined axis with the seat surfaces of the valve seat and the valve body being in contact with each other so that foreign matter attached to the seat surfaces and their peripheral portions can be scraped. This ensures setting of the valve body to the valve seat to close the channel so that leakage of fluid caused by foreign matter attached to the valve body or the valve seat can be prevented or reduced.

DESCRIPTION OF EMBODIMENTS

An embodiment of the present application will be described hereinafter with reference to the drawings. The following embodiment is merely a preferred example in nature, and is not intended to limit techniques disclosed in this application, objects of applications, and the range of use of the applications.

Figure 1:
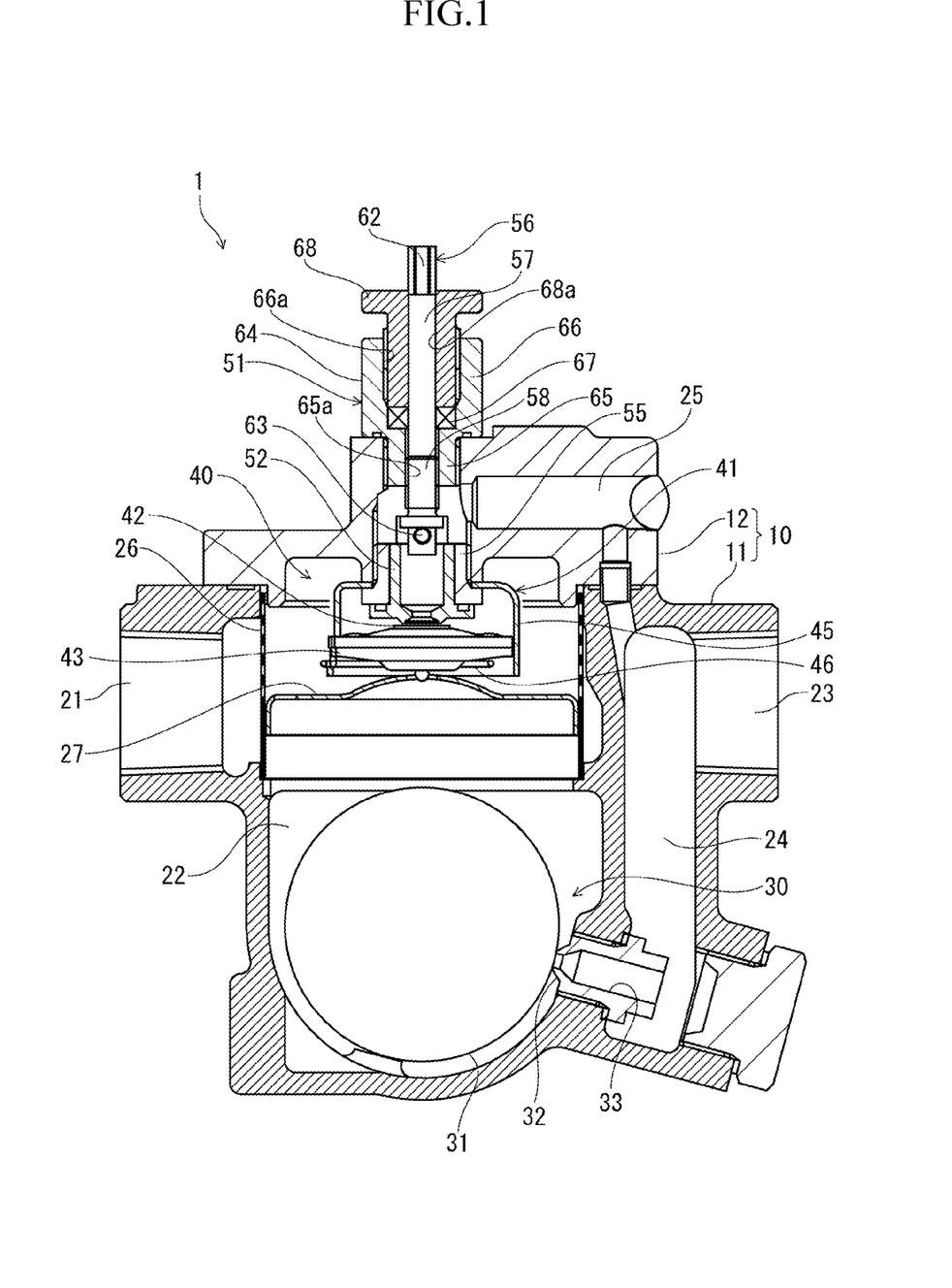
FIG. 1 is a cross-sectional view illustrating a schematic configuration of a drain trap according to an embodiment.

The drain trap 1 of this embodiment allows an outflow of drain when drain flows in, and hinders an outflow of steam when steam flows in. The drain trap 1 is an example of a valve device, and drain is an example of fluid. As illustrated in FIG. 1, the drain trap 1 includes a casing 10 having a channel for fluid, and two valve mechanisms 30 and 40 disposed in the channel and configured to open and close the channel. Drain that has flowed in the casing 10 basically flows out from the casing 10 through the first valve mechanism 30. The second valve mechanism 40 basically discharges air that has flowed in the casing 10. It should be noted that the second valve mechanism 40 discharges drain that has flowed into the casing 10, in some cases.

The casing 10 includes a body 11 and a lid 12 that is attached to the body 11. The casing 10 has an inlet 21 through which fluid flows in the casing 10, a reservoir 22 that stores fluid, and an outlet 23 through which fluid flows out of the casing 10. The casing 10 also includes a first discharge passage 24 allowing the reservoir 22 and the outlet 23 to communicate with each other, and a second discharge passage 25 allowing the reservoir 22 and the first discharge passage 24 to communicate with each other.

In the casing 10, the channel is formed by the inlet 21, the reservoir 22, the outlet 23, the first discharge passage 24, and the second discharge passage 25. Specifically, the channel includes a first channel for discharging drain, and a second channel for discharging air and drain. The first channel is formed by the inlet 21, the reservoir 22, the first discharge passage 24, and the outlet 23. The second channel is formed by the inlet 21, the reservoir 22, the second discharge passage 25, the first discharge passage 24, and the outlet 23.

The reservoir 22 is formed by the body 11 and the lid 12, and stores drain. The inlet 21 is formed in the body 11, and communicates with an upper portion of the reservoir 22. The outlet 23 is formed in the body 11. The inlet 21 and the outlet 23 are formed on the same axis extending horizontally. The first discharge passage 24 is formed in the body 11, and has an upstream end communicating with a lower portion of the reservoir 22. A downstream end of the first discharge passage 24 communicates with the outlet 23. The second discharge passage 25 is formed across the body 11 and the lid 12, has an upstream end communicating with an upper portion of the reservoir 22 and a downstream end communicating with the first discharge passage 24.

The first valve mechanism 30 includes a first valve body 31 and a first valve seat 32. The first valve body 31 is a hollow spherical float, and housed in the reservoir 22 in a free state. The first valve seat 32 is disposed at the upstream end of the first discharge passage 24. The first valve seat 32 has a valve hole 33. An upstream end of the valve hole 33 constitutes an orifice. When drain in the reservoir 22 increases, the first valve body 31 rises, and is separated from the first valve seat 32. On the other hand, when drain in the reservoir 22 decreases, the first valve body 31 lowers, and is seated on the first valve seat 32. In this manner, the first discharge passage 24, and eventually the first channel, are opened and closed. That is, the first valve body 31 rises and lowers in accordance with the storage level of drain (drain level) in the reservoir 22 to open and close the valve hole 33 of the first valve seat 32.

The reservoir 22 is provided with a screen 26 in a portion communicating with the inlet 21. The screen 26 can prevent or reduce an inflow of foreign matter (relatively large foreign matter) from the inlet 21 into the reservoir 22. The reservoir 22 is also provided with a valve cover 27 near an upper portion of the reservoir 22. The valve cover 27 is disposed above the first valve seat 32, and partitions the reservoir 22 into upper and lower parts. The valve cover 27 is formed in the shape of a flat vessel, and the open side of the valve cover 27 faces downward. The valve cover 27 serves as a bulging portion 27a having a spherical surface bulging upward in a center portion thereof. The valve cover 27 is a restriction member that restricts rising of the first valve body 31 to a predetermined height or more. When the first valve body 31 rises to the valve cover 27 and contacts the valve cover 27, the rising movement thereof is thereby restricted. In the state where the rising movement is restricted, the first valve body 31 fits in the bulging portion 27a. Although not shown, the valve cover 27 has a through hole in which drain from the inlet 21 flows.

Figure 2:
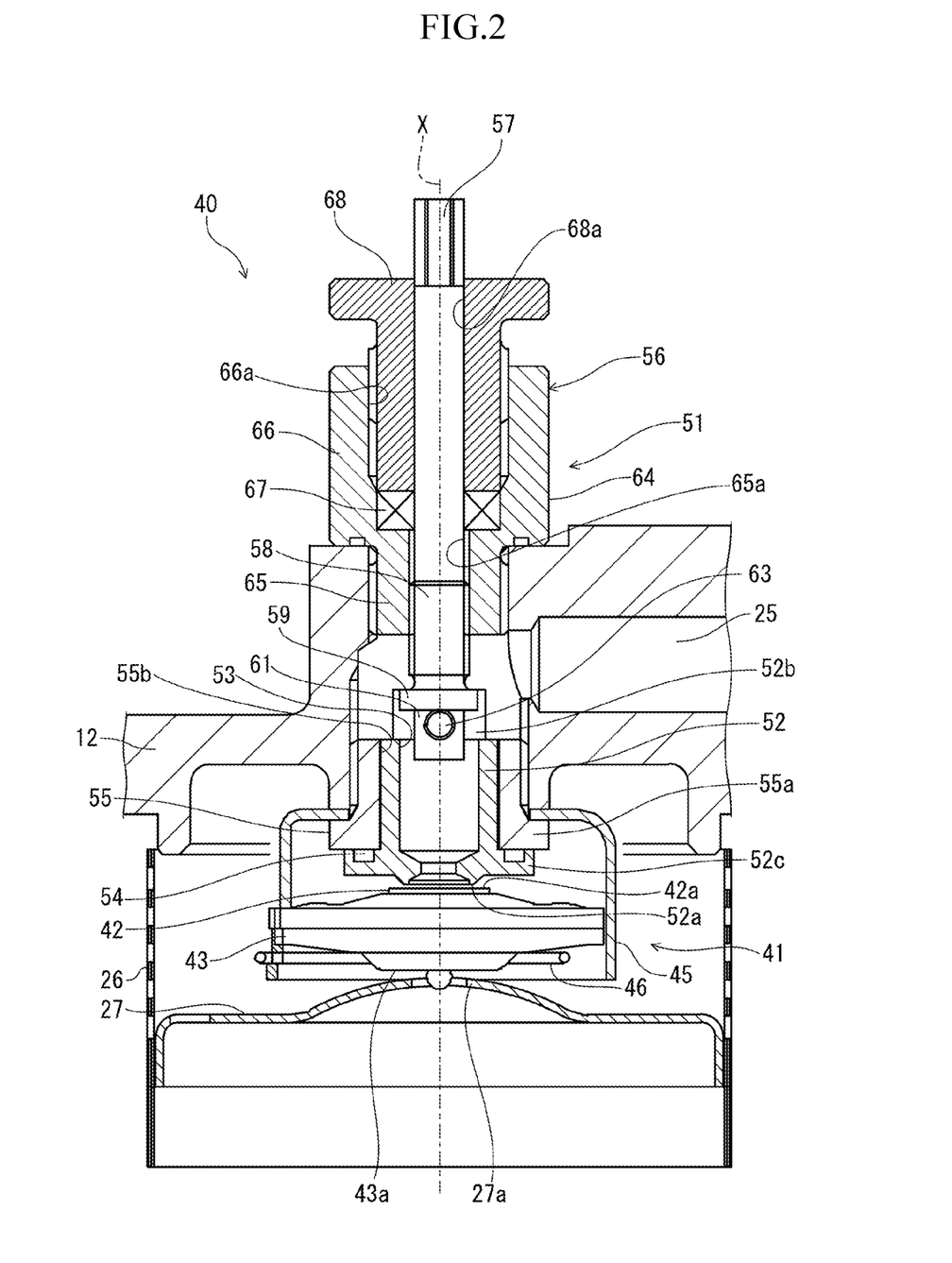
FIG. 2 is a cross-sectional view illustrating a main portion of a second valve mechanism according to the embodiment in an enlarged manner.

The second valve mechanism 40 is a thermally actuated valve mechanism that discharges fluid at a temperature less than a predetermined temperature (e.g., air or drain) and stops discharge of fluid at a temperature greater than or equal to the predetermined temperature (e.g., steam). The second valve mechanism 40 is disposed above the valve cover 27, and opens and closes the second discharge passage 25, and eventually the second channel. As also illustrated in FIG. 2, the second valve mechanism 40 includes a valve body unit 41 and a valve seat unit 51, and corresponds to a valve mechanism recited in claims of the present application. The valve body unit 41 is disposed in an upper portion of the reservoir 22 corresponding to a communication portion of the second discharge passage 25. The valve seat unit 51 is disposed at the upstream end of the second discharge passage 25.

The valve body unit 41 includes a second valve body 42, a thermally actuated portion 43, a retention member 45, and a spring 46. The second valve body 42, the thermally actuated portion 43, and the spring 46 correspond to a valve body, a driving portion, and an elastic member, respectively, recited in claims of the present application.

Figure 3:
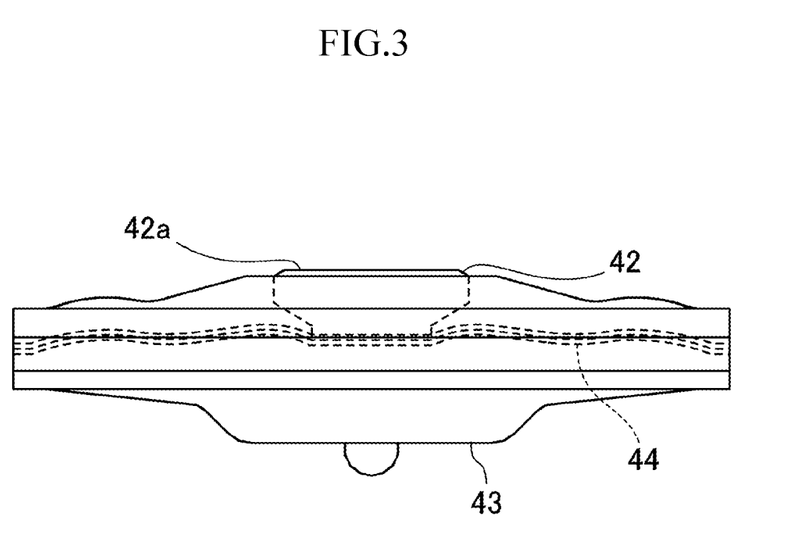
FIG. 3 is a front view illustrating a main portion of a valve body unit according to the embodiment.

As also illustrated in FIG. 3, the thermally actuated portion 43 has a substantially disc shape in which an expansion medium is hermetically sealed therein. At least a portion of the thermally actuated portion 43 is formed by a diaphragm 44. The diaphragm 44 is constituted by a plurality of metal thin films. The second valve body 42 is attached to the diaphragm 44. The expansion medium expands and contracts depending on the temperature. Example of the expansion medium includes water, a liquid having a boiling point lower than that of water, and a mixture thereof. In the thermally actuated portion 43, the diaphragm 44 deforms (is displaced) by expansion and contraction of the expansion medium, and the second valve body 42 is displaced accordingly. That is, the thermally actuated portion 43 is displaced depending on the temperature of fluid to thereby displace the second valve body 42 along a center axis X and to be separated from and seated on a seat surface 52a of a second valve seat 52 described later. The center axis X is a center axis of the seat surface 52a having a ring shape. The direction of the center axis X coincides with the top-bottom direction.

The upper end surface of the second valve body 42 is a seat surface 42a. The seat surface 42a is formed as a circular flat surface. The seat surface 42a of the second valve body 42 faces the seat surface 52a of the second valve seat 52. The retention member 45 is in the shape of a cylindrical columnar vessel that is open at the lower end and houses the second valve body 42 and the thermally actuated portion 43 therein. The spring 46 is supported by the retention member 45, and is located upstream of the thermally actuated portion 43 and holds the thermally actuated portion 43. That is, the spring 46 indirectly holds the second valve body 42 through the thermally actuated portion 43. The spring 46 is elastic along the center axis X, and biases the thermally actuated portion 43 toward the second valve seat 52.

Specifically, in the valve body unit 41, when the temperature of the thermally actuated portion 43 increases, the expansion medium expands so that the diaphragm 44 deforms (is displaced) and the second valve body 42 is displaced to be seated on the second valve seat 52. When the temperature of the thermally actuated portion 43 decreases, the expansion medium contracts so that the diaphragm 44 deforms (is displaced) and the second valve body 42 is displaced to be separated from the second valve seat 52. In this manner, the second discharge passage 25, and eventually the second channel, are opened and closed. This example employs the expansion medium that causes the second valve body 42 to be separated from the second valve seat 52 at temperatures substantially equal to the temperature of drain and causes the second valve body 42 to be seated on the second valve seat 52 at temperatures substantially equal to the temperature of steam.

The valve seat unit 51 includes the second valve seat 52, a guide member 55, and a driving portion 56. The second valve seat 52 corresponds to a valve seat recited in claims of the present application. The second valve seat 52 has a substantially tubular shape through which a valve hole 53 is formed, and extends along the center axis X. The upstream end of the second valve seat 52 has a flange 52c. A center portion of the flange 52c bulges from to its peripheral portions, and has an end surface serving as a ring-shaped seat surface 52a. The seat surface 52a is flat, and has the valve hole 53. The reservoir 22 and the second discharge passage 25 communicate with each other through the valve hole 53. The upstream end of the second valve seat 52 projects from the second discharge passage 25 into the reservoir 22.

The guide member 55 has a substantially tubular member in which a through hole 55b is formed along the center axis X. The outer peripheral surface of the guide member 55 has an external thread that is screwed to the casing 10. The upstream end of the guide member 55 has a flange 55a. The guide member 55 is disposed such that the flange 55a projects into the reservoir 22. The inner diameter of the through hole 55b of the guide member 55 is substantially equal to the outer diameter of the second valve seat 52, and the second valve seat 52 is inserted in the through hole 55b of the guide member 55. The second valve seat 52 is inserted in the guide member 55 to move back and forth along the center axis X. The second valve seat 52 is inserted in the guide member 55 to be rotatable about the center axis X, that is, pivotable about the center axis X.

The retention member 45 of the valve body unit 41 is held with an upper portion thereof sandwiched between the flange 55a of the guide member 55 and the casing 10. The second valve seat 52 is inserted in the guide member 55 with the flange 52c located outside the guide member 55. The flange 52c has a gasket 54 that seals a gap between the flange 52c and the flange 55a of the guide member 55.

The driving portion 56 is disposed in an upper portion of the casing 10 (lid 12). The driving portion 56 is configured to rotate and move the second valve seat 52 back and forth. The driving portion 56 includes a driving shaft 57 and a retention member 64.

The driving shaft 57 is a circular rod member coaxially provided with the center axis X, and a lower end portion of the driving shaft 57 is coupled to the second valve seat 52. A screw portion 58 is formed in a portion slightly lower than the axial center in the driving shaft 57, and a large-diameter portion 59 is formed below the screw portion 58 and continuous to the screw portion 58. A coupling portion 61 is formed in a lower end portion of the driving shaft 57, and an operation portion 62 is formed in an upper portion of the driving shaft 57. An external screw is formed on the outer peripheral surface of the screw portion 58.

The retention member 64 is a substantially tubular member, and includes a large-diameter portion 66 and a small-diameter portion 65 disposed in this order from the top. An external screw is formed on the outer peripheral surface of the retention member 64. The small-diameter portion 65 is screwed to a screw hole of the casing 10 so that the retention member 64 is attached to the casing 10. The small-diameter portion 65 and the large-diameter portion 66 have screw holes 65a and 66a, respectively. The screw portion 58 is screwed to the screw hole 65a of the small-diameter portion 65 so that the driving shaft 57 is retained by the screw hole 65a.

The screw hole 66a of the large-diameter portion 66 is provided with a gasket 67. The gasket 67 is pressed against the retention member 64 by a pressing member 68 screwed to the screw hole 66a of the large-diameter portion 66. The pressing member 68 has a through hole 68a in which the driving shaft 57 is inserted. The driving shaft 57 is disposed such that the operation portion 62 projects from the pressing member 68. A part of the driving shaft 57 including the operation portion 62, and the pressing member 68 are located outside the casing 10. The operation portion 62 is a portion to which a tool for rotating the driving shaft 57 is connected.

Figure 4:
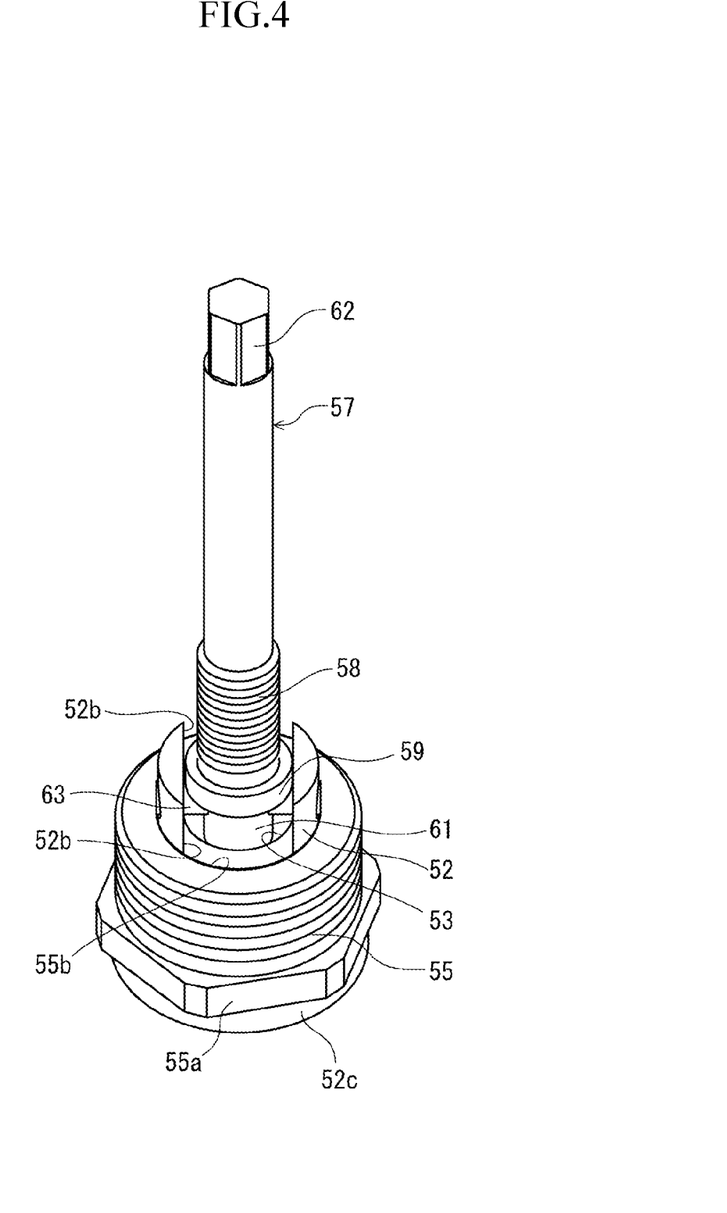
FIG. 4 is a perspective view illustrating a main portion of the valve seat unit according to the embodiment.
Figure 5:
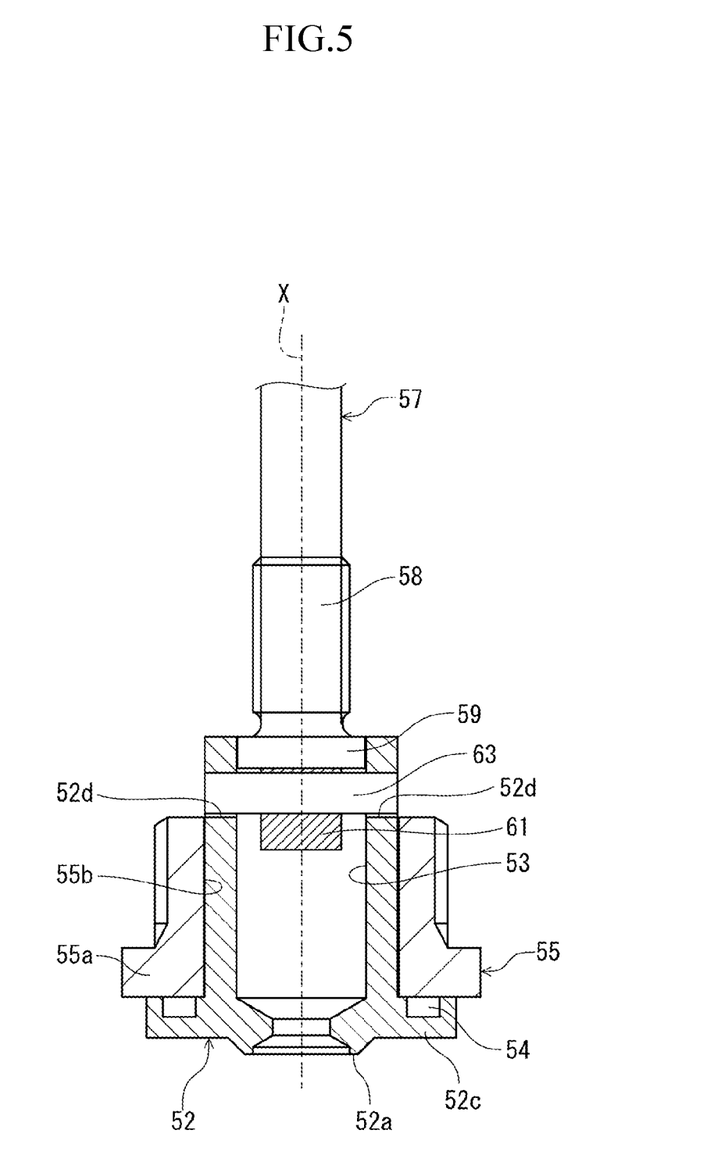
FIG. 5 is a cross-sectional view illustrating the main portion of the valve seat unit according to the embodiment.

As also illustrated in FIGS. 4 and 5, the coupling portion 61 of the driving shaft 57 is coupled to the second valve seat 52. Specifically, the coupling portion 61 is provided with a coupling pin 63 extending orthogonally to the center axis X. Two cutout portions 52b that are partially cut out are provided in a downstream end portion of the second valve seat 52. The two cutout portions 52b are shifted from each other by 180° along the circumference of the second valve seat 52. The two cutout portions 52b are openings through which fluid that has flowed into the valve hole 53 from the reservoir 22 flows out to the second discharge passage 25. The driving shaft 57 is coupled to the second valve seat 52 by inserting both ends of the coupling pin 63 into a through hole 52d formed in the downstream end portion of the second valve seat 52. The second valve seat 52 is rotatable about the coupling pin 63. The outer diameter of the large-diameter portion 59 of the driving shaft 57 is slightly smaller than the inner diameter of the valve hole 53 of the second valve seat 52.

In the thus-configured driving portion 56, when the driving shaft 57 is rotated by a tool, the driving shaft 57 moves back and forth along the center axis X while rotating, and accordingly, the second valve seat 52 moves back and forth along the center axis X while rotating. This back and forth movement of the second valve seat 52 causes the seat surface 52a of the second valve seat 52 and the seat surface 42a of the second valve body 42 to be separated from each other and brought into contact with each other.

Basic Operation

A basic operation of the drain trap 1 described above will be described. In the basic operation, the channel is opened and closed by the first valve mechanism 30 and the second valve mechanism 40. At start-up of the steam system including the drain trap 1, the temperature of the thermally actuated portion 43 is low, and the second valve body 42 is separated from the second valve seat 52. In a case where no or a small amount of drain is present in the casing 10, the first valve body 31 is seated on the first valve seat 32. That is, the first valve mechanism 30 is closed, and the second valve mechanism 40 is open.

When the steam system starts from this state, drain starts flowing from the inlet 21 into the reservoir 22. At this time, air present in a pipe connected to the inlet 21 flows into the reservoir 22 together with drain. Drain that has flowed into the reservoir 22 is gradually accumulated in a lower portion of the reservoir 22. When the amount of drain stored in the reservoir 22 increases, the first valve body 31 rises and is separated from the first valve seat 32. Accordingly, the first valve mechanism 30 is opened so that drain in the reservoir 22 flows out of the outlet 23 through the first discharge passage 24.

Air that has flowed into the reservoir 22 remains in an upper portion of the reservoir 22. At this time, unless the temperature of air is excessively high, since the volume (i.e., the degree of expansion) of the expansion medium of the thermally actuated portion 43 is small, the amount of deformation (amount of displacement) of the diaphragm 44 is small, and the second valve body 42 remains separated from the second valve seat 52. That is, the second valve mechanism 40 remains open. Thus, air flows into the second discharge passage 25 through the second valve mechanism 40, passes through the first discharge passage 24, and then flows out of the outlet 23. At this time, in the second valve mechanism 40, air that has flowed in the valve hole 53 flows out to the second discharge passage 25 from the two cutout portions 52b.

In a case where the amount of drain flowing from the inlet 21 is larger than the amount of drain discharged from the first valve mechanism 30, drain increases in amount in the reservoir 22 and is accumulated to an upper level in the reservoir 22. Accordingly, the temperature of the thermally actuated portion 43 approaches the temperature of drain. In this example, in a case where the temperature of the expansion medium of the thermally actuated portion 43 is substantially equal to that of drain, the volume (i.e., the degree of expansion) of the expansion medium is small, and the amount of deformation (the amount of displacement) of the diaphragm 44 is small. Thus, the second valve body 42 remains separated from the second valve seat 52. Accordingly, drain flows into the second discharge passage 25 through the second valve mechanism 40, passes through the first discharge passage 24, and then flows out of the outlet 23. At this time, in the second valve mechanism 40, drain that has flows in the valve hole 53 flows out to the second discharge passage 25 from the two cutout portions 52b.

On the other and, when steam flows from the inlet 21 into the reservoir 22, drain in the reservoir 22 is discharged from the first valve mechanism 30 and gradually decreases in amount, and subsequently, the first valve body 31 is seated on the first valve seat 32. In this manner, the first valve mechanism 30 is made open so that discharge of steam from the first valve mechanism 30 is inhibited.

When steam flows into the reservoir 22, the temperature of the thermally actuated portion 43 increases, and the expansion medium expands. The expansion of the expansion medium causes the diaphragm 44 to be deformed (displaced), and accordingly, the second valve body 42 is displaced upward and is seated on the second valve seat 52. In this manner, the second valve mechanism 40 is closed so that discharge of steam from the second valve mechanism 40 can be inhibited.

In the manner described above, the drain trap 1 allows inflow drain and air to flow out downstream, while preventing or reducing outflow of inflow steam.

In the second valve mechanism 40 in the basic operation described above, the second valve seat 52 and the driving shaft 57 are located at the highest position. That is, as illustrated in FIG. 2, the second valve seat 52 is retreated (displaced upward) until the flange 52c contacts the flange 52c of the guide member 55. Strictly, the flange 52c of the second valve seat 52 and the flange 55a of the guide member 55 do not contact with each other because of the gasket 54 in some cases, and the second valve seat 52 is retreated until the gasket 54 is crushed to a necessary degree. In this manner, since the second valve seat 52 is located at the highest position, a gap between the second valve seat 52 and the guide member 55 is sealed by the gasket 54 so that leakage of fluid can be prevented or reduced.

Cleaning Operation

A cleaning operation of the drain trap 1 described above will be described. In the cleaning operation, foreign matter is removed from the second valve mechanism 40.

In the second valve mechanism 40, foreign matter such as scales can be deposited on the second valve body 42 and the second valve seat 52. Specifically, foreign matter such as scales is likely to be deposited in a position to be subjected to pressure reduction. A gap between the second valve body 42 and the second valve seat 52 has a channel cross-sectional area smaller than those of the other portions in the channel even while the valve is open. Thus, each of the second valve body 42 and the second valve seat 52 serves as a throttle that reduces the pressure of drain passing through the throttle. When drain is subjected to pressure reduction and evaporates, scales are likely to be generated. Consequently, foreign matter such as scales can be deposited on the second valve body 42 and the second valve seat 52. When foreign matter is deposited on at least one of the seat surface 42a of the second valve body 42 and the seat surface 52a of the second valve seat 52, the second valve mechanism 40 cannot be closed so that leakage of steam might occur.

Figure 6:
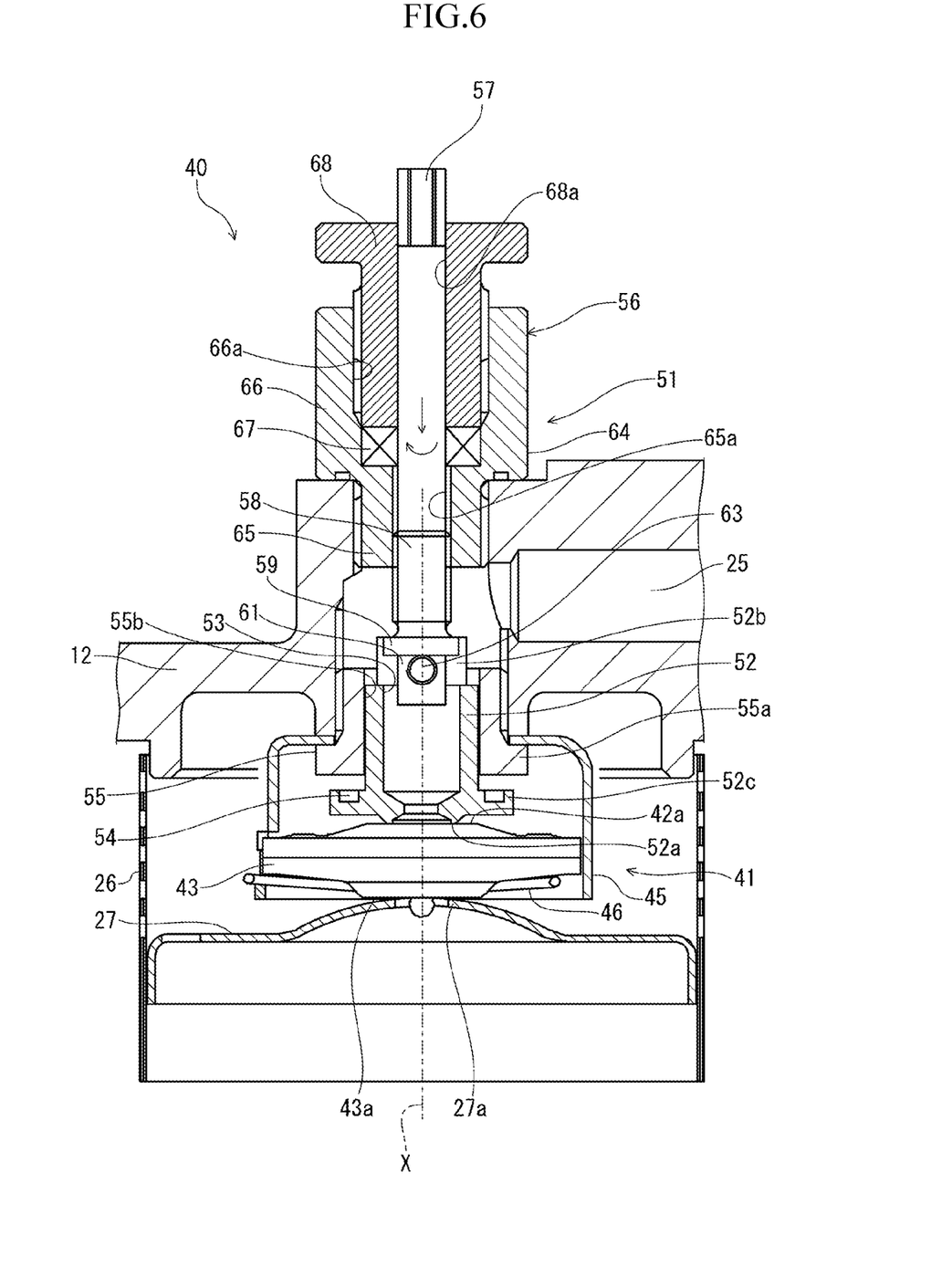
FIG. 6 is a cross-sectional view illustrating a main portion of a second valve mechanism according to the embodiment in an enlarged manner.

In view of this, in the second valve mechanism 40, a cleaning operation is performed regularly or when the amount of foreign matter becomes large. A cleaning operation performed while the second valve mechanism 40 is closed will be described. In the cleaning operation, an operator rotates the driving shaft 57 with a tool. Then, as illustrated in FIG. 6, the driving shaft 57 moves forward (is displaced downward) while rotating, and accordingly, the second valve seat 52 also moves forward (is displaced downward) while rotating. When the second valve seat 52 moves forward to a predetermined distance, the second valve seat 52 contacts the second valve body 42. That is, the seat surface 52a of the second valve seat 52 and the seat surface 42a of the second valve body 42 contact with each other. Strictly, foreign matter is present between the seat surfaces 42a and 52a.

In addition, when the driving shaft 57 moves forward while rotating, the second valve seat 52 moves forward while rotating. At this time, since the thermally actuated portion 43 is held by the spring 46 that is elastic along the center axis X (i.e., in directions in which the second valve seat 52 moves back and forth), the thermally actuated portion 43 can be displaced downward together with the second valve body 42 against a biasing force of the spring 46. Thus, when the operator further rotates the driving shaft 57, the second valve seat 52 thereby moves forward (is displaced downward) while further rotating after having contacted the second valve body 42. Accordingly, the thermally actuated portion 43 is displaced downward together with the second valve body 42. This causes the spring 46 to bend downward. That is, the second valve seat 52 rotates with the seat surface 52a being in contact with the seat surface 42a of the second valve body 42. This rotation of the second valve seat 52 removes foreign matter deposited on the seat surfaces 42a and 52a. In this manner, foreign matter deposited in the second valve mechanism 40 is removed.

After the second valve seat 52 has contacted the second valve body 42, the operator rotates the second valve seat 52 to a predetermined degree and then rotates the driving shaft 57 reversely. Then, the driving shaft 57 moves backward (is displaced upward) while rotating reversely, and accordingly, the second valve seat 52 also moves backward (is displaced upward) while rotating reversely. At this time, the thermally actuated portion 43 is displaced upward by a biasing force of the spring 46. That is, when the second valve seat 52 moves backward (is displaced upward), the thermally actuated portion 43 follows the second valve seat 52 and is displaced upward together with the second valve body 42. Thus, the second valve seat 52 also rotates with the seat surface 52a being in contact with the seat surface 42a of the second valve body 42 during the backward movement. Through this rotation of the second valve seat 52 in the backward movement, foreign matter deposited on the seat surfaces 42a and 52a is further scraped. In this manner, foreign matter is also removed during the backward movement of the second valve seat 52. Subsequently, when the second valve seat 52 is rotated reversely to the predetermined degree equal to that in forward movement, for example, the thermally actuated portion 43 returns to the original position and stops return displacement, and the second valve seat 52 is separated from the second valve body 42. When the second valve seat 52 returns to the original position (i.e., the position in the basic operation), the cleaning operation is completed.

Next, a cleaning operation while the second valve mechanism 40 is closed will be described. The cleaning operation is performed with the seat surface 42a of the second valve body 42 and the seat surface 52a of the second valve seat 52 being in contact with each other. In a manner similar to the cleaning operation while the valve is open, the operator rotates the driving shaft 57 with a tool. Then, the driving shaft 57 moves forward (is displaced downward) while rotating, and accordingly, the second valve seat 52 also moves forward (is displaced downward) while rotating. Accordingly, the thermally actuated portion 43 is displaced downward together with the second valve body 42 against a biasing force of the spring 46. This causes the spring 46 to bend downward. That is, the second valve seat 52 rotates with the seat surface 52a being in contact with the seat surface 42a of the second valve body 42. This rotation of the second valve seat 52 removes foreign matter deposited on the seat surfaces 42a and 52a.

Subsequently, the operator rotates the driving shaft 57 reversely so that the second valve seat 52 moves backward (is displaced upward). Then, the thermally actuated portion 43 follows the second valve seat 52 and is displaced upward together with the second valve body 42, by a biasing force of the spring 46. Thus, the second valve seat 52 also rotates with the seat surface 52a being in contact with the seat surface 42a of the second valve body 42 during backward movement. Through this rotation of the second valve seat 52 during the backward movement, foreign matter deposited on the seat surfaces 42a and 52a is further scraped.

In the manner described above, foreign matter deposited on the seat surfaces 42a and 52a of the second valve body 42 and the second valve seat 52 is removed by rotation of the second valve seat 52. Consequently, leakage of steam in the second valve mechanism 40 can be prevented or reduced.

In the cleaning operation described above, when the thermally actuated portion 43 is displaced downward to a given degree, downward displacement of the thermally actuated portion 43 is restricted by the valve cover 27. As illustrated in FIG. 6, when the thermally actuated portion 43 is displaced downward to a given degree by forward movement of the second valve seat 52, a lower surface 43a of the thermally actuated portion 43 contacts the bulging portion 27a of the valve cover 27. In this manner, the thermally actuated portion 43 contacts the valve cover 27 to thereby restrict downward displacement. That is, the valve cover 27 is a restriction member that restricts upward movement of the first valve body 31 and also restricts the amount of downward displacement of the thermally actuated portion 43. The restriction of downward displacement of the thermally actuated portion 43 by the valve cover 27 also restricts the amount of downward displacement of the second valve body 42 held by the thermally actuated portion 43. That is, the valve cover 27 can also be a member that restricts the amount of displacement of the second valve body 42 caused by forward movement of the second valve seat 52. Since the amount of downward displacement of the thermally actuated portion 43 is restricted as described above, a force exerted on the spring 46 is restricted.

In the manner described above, in the drain trap 1 (valve device) according to the embodiment, the second valve seat 52 is held to be movable back and forth along the center axis X of the ring shape such that the ring-shaped seat surface 52a of the second valve seat 52 and the seat surface 42a of the second valve body 42 are separated from each other and brought into contact with each other. In addition, in the drain trap 1, the second valve seat 52 is held to be rotatable about the center axis X of the ring shape.

With the configuration described above, the second valve seat 52 is moved forward so that the seat surface 52a of the second valve seat 52 can be brought into contact with the seat surface 42a of the second valve body 42, and the second valve seat 52 can further rotate. Accordingly, foreign matter deposited on the seat surfaces 42a and 52a can be scraped and removed. This ensures setting the second valve body 42 on the second valve seat 52 so that leakage of steam can be prevented or reduced. After the removal of the foreign matter, the second valve seat 52 is moved backward so that the second valve seat 52 can return to the original position.

The drain trap 1 according to the embodiment includes the driving shaft 57 coaxially provided with the center axis X and coupled to the second valve seat 52, and the retention member 64 screwed to the driving shaft 57 to hold the driving shaft 57. In the drain trap 1, the second valve seat 52 moves back and forth by rotating the driving shaft 57. With this configuration, back and forth movement and rotation movement of the second valve seat 52 can be performed at the same time only by rotating the driving shaft 57. Thus, cleaning efficiency in removing foreign matter can be enhanced.

The drain trap 1 of this embodiment includes the spring 46 (elastic member) that is elastic along the center axis X and indirectly holds the second valve body 42. With this configuration, after the second valve seat 52 has contacted the second valve body 42, the second valve body 42 can be displaced in the direction of forward movement of the second valve seat 52 together with forward movement of the second valve seat 52. Thus, after having contacted the second valve body 42, the second valve seat 52 can move forward while pressing the second valve body 42 and can rotate. Accordingly, the second valve seat 52 can be easily rotated while being kept in contact with the second valve body 42.

The drain trap 1 of this embodiment includes the thermally actuated portion 43 (driving portion) that holds the second valve body 42 and is displaced depending on the fluid temperature so that the second valve body 42 can be displaced along the center axis X to be separated from and seated on the seat surface 52a of the second valve seat 52. In addition, the drain trap 1 also includes the spring 46 (elastic member) that is elastic along the center axis X and holds the thermally actuated portion 43.

With the configuration described above, the second valve body 42 can be separated from and seated on the second valve seat 52 in accordance with the temperature of fluid. After the second valve seat 52 has contacted the second valve body 42, in accordance with forward movement of the second valve seat 52, the second valve body 42 and the thermally actuated portion 43 can be displaced in the direction of the forward movement of the second valve seat 52. Thus, after having contacted the second valve body 42, the second valve seat 52 can move forward while pushing the second valve body 42 and the thermally actuated portion 43 forward and can rotate. In this case, the second valve seat 52 can also be rotated while being kept in contact with the second valve body 42.

The second valve seat 52 has a substantially tubular end surface serving as the ring-shaped seat surface 52a, is coupled to the driving shaft 57 by the coupling pin 63 extending orthogonally to the center axis X of the seat surface 52a, and is rotatable about the coupling pin 63.

With the configuration described above, the second valve seat 52 rotates about the coupling pin 63 so that the seat surface 52a of the second valve seat 52 can be tilted with respect to the seat surface 42a of the second valve body 42. Thus, even in a case where foreign matter is locally deposited in a portion of the seat surfaces 42a and 52a, the seat surface 52a of the second valve seat 52 can be tilted along the surface on which foreign matter is deposited. Accordingly, the seat surfaces 42a and 52a can be brought into contact with each other in accordance with distribution of deposition of foreign matter. Consequently, efficiency in removing foreign matter can be enhanced.

The drain trap 1 according to this embodiment includes a restriction member that restricts the amount of downward displacement of the thermally actuated portion 43. Specifically, in the reservoir 22, the valve cover 27 (restriction member) that restricts rising of the first valve body 31 to a predetermined height or more is disposed above the first valve body 31 (float). The second valve mechanism 40 is disposed above the valve cover 27 such that the center axis X thereof coincides with the top-bottom direction, and the seat surface 52a of the second valve seat 52 contacts the seat surface 42a of the second valve body 42 by downward movement of the second valve seat 52. The thermally actuated portion 43 is displaced downward to contact the valve cover 27 so that the valve cover 27 thereby restricts the amount of downward displacement of the thermally actuated portion 43.

The configuration described above can prevent or reduce downward displacement of the thermally actuated portion 43 to a position below the predetermined position in the cleaning operation. Accordingly, a force (resistance) exerted on the spring 46 can be restricted so that damage of the spring 46 can be prevented or reduced. The amount of displacement of the second valve body 42 can also be restricted by restricting the amount of downward displacement of the thermally actuated portion 43.

Other Embodiments

The drain trap 1 according to the embodiment may have the following configuration.

For example, the drain trap 1 is not limited to a steam trap that hinders steam discharge and may be an air trap that hinders air discharge or a gas trap that hinders gas discharge, for example.

The technique disclosed in the present application is not limited to the drain trap 1, and is applicable to any valve device that controls distribution of air or liquid as fluid.

In the drain trap 1 according to the embodiment, the second valve seat 52 moves back and forth while rotating, that is, performs back and forth movement and rotation movement at the same time, but the back and forth movement and the rotation movement may be individually performed.

In the drain trap 1 according to this embodiment, the seat surface 42a of the second valve body 42 and the seat surface 52a of the second valve seat 52 are flat surfaces, but the present application is not limited to this example. For example, one of the seat surfaces 42a and 52a may be formed in a spherical recess shape with the other being formed in a conical projection shape that is surface-contact with the recess shape.

In the drain trap 1 according to this embodiment, the amount of downward displacement of the thermally actuated portion 43 is restricted by using the valve cover 27 that restricts the amount of rising movement of the first valve body 31, but a member that restricts the amount of downward displacement of the thermally actuated portion 43 may be additionally provided.

The drain trap 1 of the embodiment is a so-called float type in which the first valve body 31 of the first valve mechanism 30 is a float. However, the technique disclosed in the present application is not limited to this type, and a so-called disc type in which the first valve body of the first valve mechanism has a disc shape may be employed.

The embodiment has been directed to the drain trap 1 as an example of the valve device, but a pump device that includes a valve mechanism and pumps inflow drain may be used as another example.

As described above, the technique disclosed in the present application is useful for a valve device.

What is claimed is:

1. A valve device comprising:
a casing having a channel for a fluid; and
a valve mechanism including a valve seat having a seat surface in a ring shape and a valve body configured to be displaceable between a separated position where the valve body is separated from the seat surface of the valve seat so that the valve mechanism opens the channel, and a seated position where the valve body is seated on the seat surface of the valve seat so that the valve mechanism closes the channel, wherein
the valve seat is held to be movable back and forth along a center axis of the ring shape such that the seat surface of the valve seat and a seat surface of the valve body are separated from each other and brought into contact with each other,
the valve seat is held to be rotatable about the center axis of the ring shape, and
the valve seat has a partially tubular end surface serving as the seat surface in the ring shape, is coupled to a driving shaft by a coupling pin extending orthogonally to the center axis of the ring shape, and is rotatable about the coupling pin.

2. The valve device according to claim 1, wherein the valve mechanism includes
the driving shaft, which is coaxially provided with the center axis of the ring shape and is coupled to the valve seat, and
a retention member that is screwed to the driving shaft and holds the driving shaft, and
the valve seat is moved back and forth and rotated by rotating the driving shaft.

3. The valve device according to claim 2, wherein
the valve mechanism includes an elastic member that is elastic along the center axis of the ring shape and holds the valve body directly or indirectly.

4. The valve device according to claim 2, wherein the valve mechanism includes
a thermally actuated portion that holds the valve body and is displaced in accordance with a temperature of the fluid so that the valve body is displaced along the center axis of the ring shape to be separated from and seated on the seat surface of the valve seat, and
an elastic member that is elastic along the center axis of the ring shape and holds the thermally actuated portion.

5. The valve device according to claim 4, wherein the casing includes a fluid reservoir having an upper portion to which the channel is connected and a lower portion in which a valve hole is formed, the valve device further comprises
- a float that is housed in the reservoir and rises and lowers in accordance with a storage level of fluid in the reservoir to thereby open and close the valve hole, and
- a restriction member that is disposed above the float in the reservoir and restricts rising of the float to a height greater than or equal to a predetermined height, the valve mechanism is disposed above the restriction member such that the center axis of the ring shape coincides with a top-bottom direction, and that the seat surface of the valve seat contacts the seat surface of the valve body by downward movement of the valve seat, and the thermally actuated portion is displaced downward to contact the restriction member so that the restriction member thereby restricts an amount of downward displacement of the thermally actuated portion.

6. The valve device according to claim 1, further comprising
- a restriction member that restricts an amount of displacement of the valve body caused by forward movement of the valve seat.

* * * * *